Figure 1:
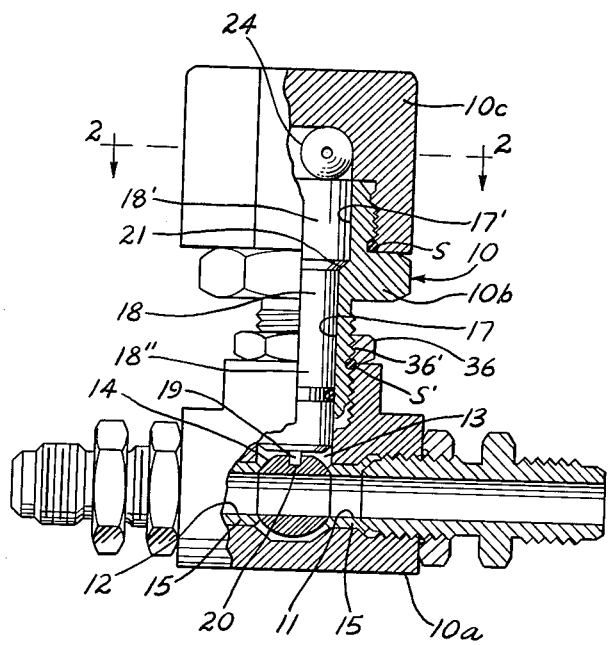

Aug. 21, 1962  V. J. ADAMS, JR., ETAL  3,049,868
REMOTELY CONTROLLED EXPLOSIVE ACTUATING MEANS
Filed July 28, 1960  2 Sheets-Sheet 1

INVENTORS
VICTOR J. ADAMS JR.
NOEL Y. ROTHMAYER
BY
William R. Wright Jr.
HIS AGENT Aug. 21, 1962  V. J. ADAMS, JR., ETAL  3,049,868
REMOTELY CONTROLLED EXPLOSIVE ACTUATING MEANS
Filed July 28, 1960  2 Sheets-Sheet 2

INVENTORS
VICTOR J. ADAMS JR.
NOEL Y. ROTHMAYER
BY
HIS AGENT 3,049,868
REMOTELY CONTROLLED EXPLOSIVE
ACTUATING MEANS
Victor J. Adams, Jr., Parsippany, and Noel Y. Rothmayer, Morristown, N.J., assignors to Thiokol Chemical Corporation, Bristol, Pa., a corporation of Delaware
Filed July 28, 1960, Ser. No. 45,890
9 Claims. (Cl. 60—26.1)

The present invention relates in general to remotely controlled explosive actuating means for any mechanism including an impulse receiving member which at a chosen instant of time is to be rapidly shifted from a pre-set position into a tripped position, and has particular reference to means of this kind peculiarly suited to the fast operation of a valve to effect the sudden stoppage or commencement of flow of fluid through a conduit.

In a typical application which has been chosen for the purpose of illustration, such as the hydraulic systems of certain rockets, it is necessary to effect the sudden stoppage of fluid flow through the system by remote or automatic actuation of a valve, or conversely to open a valve with equal suddenness. A general type of valve eminently suitable for this kind of installation is a ball valve having a diametrical orifice matching the aligned inlet ports in size and cross-sectional form and adapted to be oscillated between two terminal positions in one of which the valve orifice is in axial registration and communication with both ports and in the other of which the orifice is at right angles to the port axis and out of communication with both ports.

Prior to our present invention no one, to our knowledge, has devised remotely controlled or automatic means capable of actuating a ball valve in the desired manner for fast-acting two position shut-off or opening oscillation without employing complicated and bulky mechanisms that are likely to get out of order and fail to function reliably when required to do so at a critical instant of time.

It, therefore, is our primary object to provide remotely controlled or automatic actuating means of the explosive type for the ball valve of a rocket hydraulic system, such as has been chosen as an illustrative example, which is extremely simple and rugged in construction yet lightweight, is composed of a minimum number of moving parts that cannot get out of order, and that is so compact that it can be installed in the cramped space usually available in rockets.

Another object is to provide remotely controlled explosive actuating means for a valve of the kind just mentioned wherein means is included to lock the rotary valve member positively in tripped condition following actuation.

It is an object also to provide explosive actuating means capable of being re-set readily in order that the valve may be re-used repeatedly.

Another object is to provide explosive actuating means for application to a rotary two-position valve that can be either assembled initially or thereafter adjusted easily to set it selectively for either quick shut-off action or quick opening action depending upon operational requirements.

Figure 2:
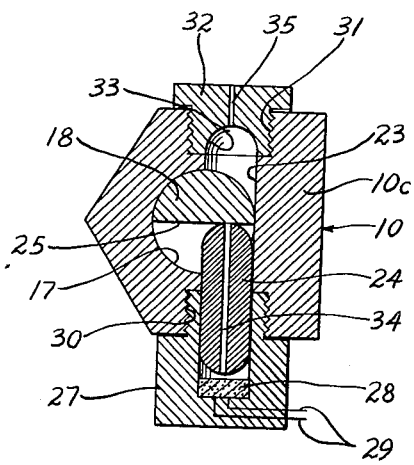
Figure 3:
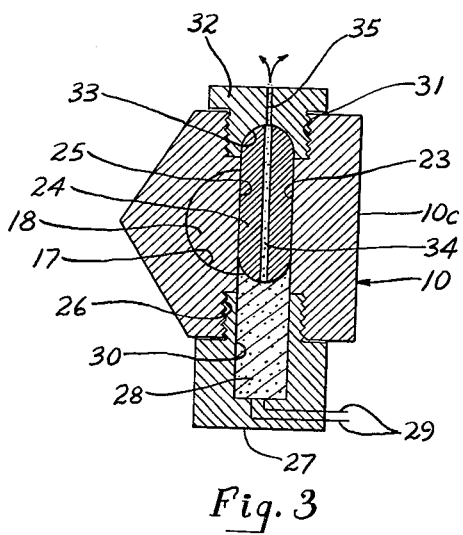
Figure 4:
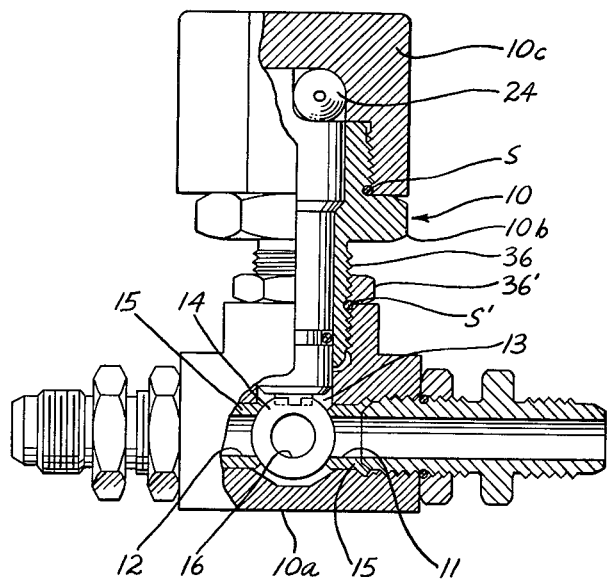
Figure 5:
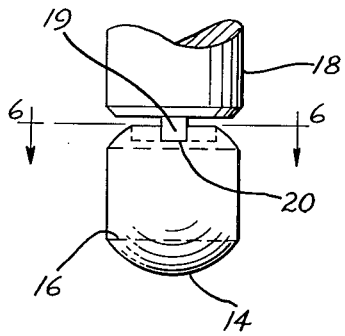
Figure 6:
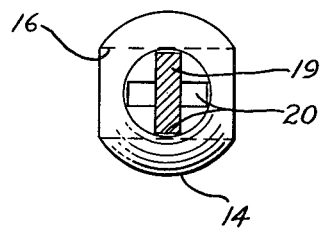

Still further objects, advantages, and features of our improved valve will become apparent as the following specific description is read in connection with the accompanying drawings, in which:

FIG. 1 is a fragmentary side elevational view of a valve having the improved explosive actuating means applied thereto, partly in vertical cross-section, showing the rotary valve member in pre-set open position ready to act as a shut-off valve;

FIG. 2 is a horizontal section on line 2—2 of FIG. 1;
FIG. 3 is a view similar to FIG. 2, showing the actuating mechanism in tripped condition with the rotary valve member positively locked in the corresponding terminal position;
FIG. 4 is a vertical section of FIG. 3;
FIG. 5 is a detail fragmentary side elevation of the lower end of the impulse transmission shaft and interengaged ball valve; and,
FIG. 6 is a horizontal section on line 6—6 of FIG. 5.

Referring now in detail to the drawings, wherein like reference characters designate corresponding parts in the several views, it will be observed that the valve chosen as an illustrative example of an impulse-receiving member as a whole includes a valve body, or housing, 10 of conventional construction for installation in close proximity to a supporting bulkhead of a rocket (not shown). In this illustrative embodiment of the invention, horizontally aligned inlet and outlet ports 11 and 12, respectively, are located in communication with a valve chamber 13 in which a valve member 14 is fitted for rotation on a vertical axis. In accordance with present practice annular seal members 15 are provided in inlet and outlet ports 11 and 12 to seat valve member 14.

While a ball-type valve member 14 is preferred for rapid two-position shut-off or opening action, it is to be understood that we are not to be limited to a valve member of this precise type. Any equivalent two-position rotary valve may be employed.

In the present embodiment, ball valve member 14 has a diametrically arranged orifice 16 which is of the same circular cross-sectional form and diameter as that of inlet and outlet ports 11 and 12 in order to provide straight through flow at low pressure drops when said valve member is in the open terminal position represented in FIG. 1. Valve member 14 is intended to be oscillated through an arc of ninety degrees between the open terminal position just mentioned and the shut-off terminal position shown in FIG. 4 in a single uninterrupted quick impulse exerted by the especially adapted explosive actuation means now to be described.

Valve body or housing 10 is for practical purposes a three-part assembly composed of a T-shaped base fitting 10a containing ball valve 14, an intermediate upstanding portion 10b and a superimposed closure cap 10c which is removably engaged with portion 10b. Through these three component parts of valve body 10 there is a vertically extending shaft-receiving bore 17 of circular cross-section whose lower end opens into valve chamber 13 in alignment with the rotational axis of valve member 14. An impulse transmission shaft 18 is journaled in bore 17 and has a depending central stem 19 of rectangular or other non-circular cross-section for removable engagement with a selected one of the perpendicularly arranged portions of a cross-shaped socket 20 of matching cross-sectional form and width provided in the top of valve, or impulse-receiving, member 14 in alignment with the geometrical center of the latter. (See FIGS. 5 and 6.) This stem and socket connection between shaft 18 and valve member 14 causes said valve member to turn with said shaft.

In order that valve member 14 will be immobilized in the selected pre-set terminal position through friction and inertia, shaft-receiving bore 17 of valve body 10 has an enlarged upper portion 17' joined to the lower portion 17" by a downwardly tapered shoulder 21, and impulse transmission shaft 18 has a similarly enlarged upper portion 18' joined to the lower portion 18" by a downwardly tapered shoulder 22 that is intended to rest upon cooperative shoulder 21 of bore 17. The friction of contact between shoulders 21 and 22 will tend to prevent any rotational displacement of valve member 14 under conditions of rest and this friction will be augmented by inertia of shaft 18 during acceleration of the supporting rocket in flight.

The explosive actuating means for imparting valve operating impulses to transmission shaft 18 either by remote control or through automatic local motivation will be understood by particular reference to FIGS. 2 and 3, from which it will be seen that the upper closure cap portion 10c of valve body 10 is provided with a horizontally extending main guide bore 23 of circular cross-section in communication with shaft-receiving bore 17 and arranged at a tangent thereto. An elongated cylindrical driver cam 24 having convexly rounded, or semi-spherical, ends is mounted for longitudinal reciprocation in main guide bore 23. For operative cooperation with driver cam 24, the upper end of impulse transmission shaft 18 has a side half portion cut away to provide a flat cam follower face 25 lying in a diametrical axial plane and adapted to be arranged in a pre-set position extending across main guide bore 23 in substantially perpendicular facing relation to one end of said driver cam when rotary valve member 14 is in its pre-set terminal position. In this position, cam follower face 25 will receive motion imparted by impingement of driver cam 24 against said face and be driven by said cam in oscillation through an angle of ninety degrees into a tripped position, wherein said cam follower face will come to bear flatly against the side of said driver cam in positively locked condition as shown in FIGS. 3 and 4.

In FIGS. 2 and 3, preferred means for imparting an actuating impulse to driver cam 24 by remote control is illustrated. In this embodiment, upper closure cap portion 10c of valve body 10 is provided with a screwthreaded first opening 26 in registration with the end of main guide bore 23 that is faced by cam follower face 25 when in pre-set position. A charge-containing cap 27, which may be of inexpensive plastic construction so as to be expendable, is adapted to be threaded into first opening 26. Each such charge-containing cap 27 is loaded with a small explosive charge 28, or squib, composed of a combustible propellent just sufficient upon combustion and subsequent gas generation to impart the required force to driver cam 24. Ignition of the combustible propellent is accomplished by various means, such as the electrical fusing wires 29—29 shown in the acompanying drawings, by mechanically actuated trigger pin mechanisms (not shown), or in any manner known to those skilled in the art.

An auxiliary guide bore 30 is provided in charge-containing cap 27 in prolongation of main guide bore 23 in upper closure cap portion 10c of valve body 10. This auxiliary guide bore 30 is of the same cross-sectional form and diameter as main guide bore 23 and serves to increase the overall bearing surfaces for driver cam 24.

Diametrically opposite to first opening 26 and in axial alignment therewith closure cap portion 10c of valve body 10 is provided with a second opening 31 which preferably is of precisely the same diameter as first opening 26 and has screw threads that match those of said first opening. A screwthreaded impact resisting, or stop, cap 32 is adapted to be engaged with second opening 31 and is provided with a semi-spherical socket or recess 33 in its inner end to receive the adjacent end face of driver cam 24 when it reaches the tripped position shown in FIG. 3. In order that gaseous products of combustion of explosive or propellent charge 28 may be vented, driver cam 24 and impact resisting cap 32 are provided with aligned central through passages 34 and 35, respectively. Passage 34 in driver cam 24 is made larger in diameter than passage 35 in impact resisting cap 32 in order to prevent "peening-over" action on the inner end of passage 35, such as might close or constrict the latter passage inadvertently.

Upper closure cap portion 10c of valve body 10 has screwthreaded connection with intermediate portion 10b to permit ready removal of said closure cap portion for the purpose of giving access to impulse transmission shaft 18 for rotational or axial adjustment and complete removal under circumstances to be hereinafter described. Where closure cap portion 10c of valve body 10 bottoms on intermediate portion 10b, a sealing ring s of suitable type is installed to prevent fluid leakage.

The lower end of intermediate portion 10b of valve body 10 has a screwthreaded connection with base fitting 10a and a sealing ring s' is installed at this juncture in interposed relation to said fitting and a bulkhead retaining or locking jam nut 36 which is applied to the externally screwthreaded portion 36' of said intermediate portion 10b of valve body 10 to exert tightening pressure on sealing ring s'.

To prepare the device as a whole for operational use, the first step is to pre-set valve, or impulse-receiving, member 14 and impulse transmission shaft 18 in the operative terminal position in which they are to remain until tripped into the ultimate terminal position. In other words, if the device is to function as a shut-off valve, valve member 14 will be pre-set in the open position represented in FIGS. 1 and 2. Because access must be gained to valve member 14, the upper sub-assembly comprising intermediate portion 10b and closure cap portion 10c of valve body 10 must be detached from connection with base fitting 10a. Before this can be accomplished by unscrewing said intermediate portion from said base fitting, jam nut 36 must be loosened in its engagement with sealing ring s'. Then, when this has been done, stem 19 at the lower end of impulse transmission shaft 18 will have become disengaged from socket or recess 20 in valve member 14, so that the latter may be set in open terminal position. Now, before intermediate portion 10b can be screwed back into engagement with base fitting 10a, closure cap portion 10c must be unscrewed from its connection with intermediate portion 10b to permit access to impulse transmission shaft. Thereafter, charge-containing cap 27 is removed with driver cam 24 still fitted in auxiliary guide bore 30 thereof. This is done to permit free angular and axial adjustment of impulse transmission shaft 18. With said shaft held in elevated position, intermediate portion 10b of valve body 10 is restored to screwthreaded engagement with base fitting 10a and jam nut 36 is tightened. The next step is to rotate shaft 18 partially until in the pre-set position shown in FIG. 2, wherein cam follower face 25 is in the plane of the aligned axes of orifice 16 in valve member 14 and the respective inlet and outlet ports 11 and 12, and to lower shaft 18 until stem 19 becomes engaged with the registering portion of socket or recess 20 in valve member 14. Closure cap portion 10c of valve body 10 is now screwed back onto intermediate portion 10b. After visual inspection through first opening 26 in closure cap portion 10c to insure location of cam follower face 25 of impulse transmission shaft 18 at right angles to the axis of main guide bore 23, charge-containing cap 27 and contained driver cam 24 are re-installed in operative position in said portion 10c. The device is now pre-set for instantaneous shut-off operation.

At an appropriate time to shut off valve 14, the electrical circuit of wires 29—29 is closed, either by remote control or automatic means. This action will cause ignition of explosive or combustible propellent charge 28 and instantaneous exertion of a power impulse on driver cam 24, which latter will be thrust endwise from the position shown in FIG. 2 to the position shown in FIG. 3. As a result, cam follower face 25 of impulse transmission shaft 18 will be partially rotated through an arc of ninety degrees until stopped by abutment against the side of driver cam 24 in the locked position shown in FIG. 3. Consequently, valve member 14 will be shifted in an instant of time from its pre-set terminal position (open) into its tripped terminal position (closed).

Conversely, if valve member 14 has been pre-set in closed terminal position for practical reasons, it will be turned into its opposite open terminal tripped position.

When operational conditions permit re-use of the device, the procedure is to remove charge-containing cap 27 and driver cam 24; then remove closure cap portion 10c and rotate impulse transmission shaft 18 back to re-set terminal position, replace closure cap portion 10c, check the angular arrangement of cam follower face 25, restore driver cam 24 to its original position in guide bores 30 and 23, and engage a fresh (loaded) charge-containing cap 27 in first opening 26. These steps presuppose an intention to re-use the valve as a shut-off valve.

Assuming that valve member 14 and cam follower face 25 of impulse transmission shaft 18 are pre-set for operation as a shut-off valve and that charge-containing cap 27 is loaded, to convert to a quick-opening valve when circumstances require it, the procedural steps are the same as previously described for presetting the device for shut-off operation except that ball valve member 14 is pre-set in the closed position shown in FIG. 4 and maintained in that position until charge-containing cap 27 has been re-installed in first opening 26 of closure cap portion 10c of valve body 10.

It should now be apparent that we have devised a very versatile valve device which, under appropriate circumstances, can be pre-set selectively for shut-off or quick-opening operation; can be re-used by re-setting and loading with a fresh charge-containing cap; and can be converted from either pre-set valve operating condition to the other. Moreover, it should be obvious that the device is adapted to be installed on either side of a bulkhead without physical modification or alteration. All that is necessary is to reverse the connections of charge-containing cap 27 and impact resisting cap 32 with first and second openings 26 and 31 in closure cap portion 10c of valve body 10.

Although the improved explosive actuating means has been illustrated in the drawings and described in the specification in application to the two-position fast-acting ball valve of the hydraulic system of a rocket, it is to be understood that it is within the scope of the present invention to employ it for the actuation of any impulse-receiving member or device for which it may be suited.

While there have been shown and described and pointed out the fundamental novel features of this invention as applied to a single physical embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

We claim:

1. Fast-acting remotely controlled actuating means for a two-position impulse-receiving member comprising a housing provided with a shaft-receiving bore of circular cross-section, an impulse transmission shaft journaled in said shaft-receiving bore and including means to connect the same to an impulse-receiving member for actuation thereof; said housing having a main guide bore communicating with said shaft receiving bore at a tangent thereto, an elongated driver cam mounted for longitudinal reciprocation above and partially within said main guide bore, said impulse transmission shaft having a side half portion thereof cut away to provide a flat cam follower face lying in a diametrical axial plane and adapted to be arranged in a pre-set position extending across said main guide bore in substantially perpendicular facing relation to one end of said driver cam to receive motion imparted by impingement of the latter against said cam follower face and be driven in rotation through an angle of ninety degrees into a tripped position bearing flatly against the side of said driver cam in locked condition, and remotely controlled means by which an actuating longitudinal impulse may be imparted to said driver cam.

2. The invention defined in claim 1, wherein the wall of the housing directly facing the pre-set cam follower face of the impulse transmission shaft has an enlarged first opening in alignment with the adjacent end of the main guide bore, and wherein the remotely controlled means by which an actuating impulse may be imparted to the driver cam includes a charge-containing cap to receive an explosive charge removably engaged with said first opening and having an auxiliary guide bore corresponding in diameter to said main guide bore and arranged in prolongation thereof to receive said driver cam.

3. The invention defined in claim 2, wherein the wall of the housing directly opposite to the first body opening has a second opening in alignment with said first opening, and wherein an impact resisting cap is removably engaged with said second opening.

4. The invention defined in claim 3, wherein the driver cam and the impact resisting cap have aligned central through vent passages for communication with the exterior to vent products of combustion of the explosive charge.

5. The invention defined in claim 4, wherein the ends of the driver cam are convexly semi-spherical in shape, and wherein the inner end of the impact resisting cap has a semi-spherical socket in communication with the vent passage therein to receive the adjacent end of said driver cam after a driving impulse has been imparted thereto and the cam follower face has been tripped.

6. The invention defined in claim 5, wherein the vent passage in the driver cam is larger in diameter than the vent passage in the impact resisting cap to prevent peening-over action.

7. The invention defined in claim 1, wherein the housing is open at its upper end to give access to said shaft for angular rotational adjustment and axial adjustment and removal, and wherein a closure cap is removably engaged with said upper end of the housing.

8. The invention defined in claim 7, to which is added, in combination, an impulse-receiving member mounted for oscillation between two terminal positions on an axis aligned with that of the impulse transmission shaft and having a non-circular central socket facing the adjacent end of the impulse transmission shaft, and wherein said shaft has a central non-circular stem projecting from its inner end constructed and arranged to fit said impulse-receiving member socket to removably connect said shaft and impulse-receiving member for movement together.

9. The invention defined in claim 1, wherein the housing is operationally arranged with the impluse transmission shaft vertical, wherein said shaft has an enlarged upper portion joined to the lower portion by a downwardly tapered shoulder, and wherein the shaft-receiving bore of said housing has an enlarged upper portion joined to the lower portion by a downwardly tapered shoulder constructed and arranged to seat said shaft shoulder with sufficient frictional contact to resist accidental rotation of the shaft.

References Cited in the file of this patent

UNITED STATES PATENTS 2,815,698   Burrows _____ Dec. 10, 1957

FOREIGN PATENTS 21,396   Germany _____ Mar. 17, 1883